United States Patent
Xu et al.

(10) Patent No.: US 10,694,527 B2
(45) Date of Patent: Jun. 23, 2020

(54) CO-EXISTENCE OF RELIABLE LOW LATENCY AND OTHER SERVICES IN A WIRELESS NETWORK

(71) Applicant: QUALCOMM Incorporated, San Diego, CA (US)

(72) Inventors: Hao Xu, Beijing (CN); Peter Gaal, San Diego, CA (US); Jing Jiang, San Diego, CA (US); Haitong Sun, San Diego, CA (US); Naga Bhushan, San Diego, CA (US); Tingfang Ji, San Diego, CA (US); Wei Zeng, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 15/667,201

(22) Filed: Aug. 2, 2017

(65) Prior Publication Data
US 2018/0042030 A1  Feb. 8, 2018

Related U.S. Application Data

(60) Provisional application No. 62/371,063, filed on Aug. 4, 2016.

(51) Int. Cl.
*H04W 72/08* (2009.01)
*H04W 72/04* (2009.01)
(Continued)

(52) U.S. Cl.
CPC ....... *H04W 72/085* (2013.01); *H04L 47/2408* (2013.01); *H04L 47/72* (2013.01);
(Continued)

(58) Field of Classification Search
CPC ............ H04W 72/085; H04W 72/042; H04W 28/0236; H04W 28/0215; H04W 72/082;
(Continued)

(56) References Cited

U.S. PATENT DOCUMENTS 9,900,393 B2 * 2/2018 Morelle ................. H04L 67/22
10,524,105 B2 * 12/2019 Lee .......................... H04W 4/90
(Continued)

FOREIGN PATENT DOCUMENTS

| WO | WO-2017018761 A1 | 2/2017 |
| WO | WO-2017023352 A1 | 2/2017 |
| WO | WO-2017035300 A1 | 3/2017 |

OTHER PUBLICATIONS

International Search Report and Written Opinion—PCT/US2017/045225—ISA/EPO—dated Oct. 26, 2017.

*Primary Examiner* — Ivan O Latorre
(74) *Attorney, Agent, or Firm* — Patterson + Sheridan, L.L.P.

(57) ABSTRACT

Certain aspects of the present disclosure provide techniques for co-existence of reliable low-latency and other services in a wireless network. According to certain aspects, a method of wireless communication by a base station is provided. The method generally includes reserving a first region of a set of resources to a first user for at least a first uplink transmission related to a first type of service, receiving the first uplink transmission in the reserved first region, and dynamically assigning resources in a second region of the set of resources for at least a second uplink transmission related to the first type of service.

26 Claims, 8 Drawing Sheets

(51) Int. Cl.
*H04L 12/851* (2013.01)
*H04L 12/911* (2013.01)
*H04W 28/02* (2009.01)

(52) U.S. Cl.
CPC ... *H04W 28/0215* (2013.01); *H04W 28/0236* (2013.01); *H04W 72/042* (2013.01); *H04W 72/082* (2013.01); *H04W 72/048* (2013.01)

(58) Field of Classification Search
CPC ... H04W 72/048; H04L 47/2408; H04L 47/72
See application file for complete search history.

(56) References Cited

U.S. PATENT DOCUMENTS

| | | | | |
|---|---|---|---|---|
| 2004/0192208 | A1* | 9/2004 | Kong | H04B 1/71072 455/63.1 |
| 2008/0014884 | A1* | 1/2008 | Oyman | H04B 7/0452 455/187.1 |
| 2008/0090575 | A1* | 4/2008 | Barak | H04W 16/10 455/444 |
| 2010/0128687 | A1* | 5/2010 | Oteri | H04L 1/1887 370/329 |
| 2012/0057535 | A1* | 3/2012 | Zhang | H04W 72/04 370/329 |
| 2014/0177492 | A1* | 6/2014 | Sun | H04L 5/0094 370/280 |
| 2015/0264733 | A1* | 9/2015 | Guo | H04W 48/06 370/329 |
| 2016/0050658 | A1* | 2/2016 | Tabet | H04L 1/1812 370/329 |
| 2016/0100395 | A1 | 4/2016 | Xu et al. | |
| 2016/0128095 | A1 | 5/2016 | Damnjanovic et al. | |
| 2016/0150525 | A1 | 5/2016 | Xu et al. | |
| 2016/0269212 | A1* | 9/2016 | Vilaipornsawai | H04L 27/2627 |
| 2017/0054595 | A1* | 2/2017 | Zhang | H04L 41/0896 |
| 2017/0201968 | A1* | 7/2017 | Nam | H04W 4/70 |
| 2017/0317904 | A1* | 11/2017 | Rasanen | H04W 28/0205 |
| 2018/0042030 | A1* | 2/2018 | Xu | H04L 47/2408 |
| 2018/0184468 | A1* | 6/2018 | Chien | H04W 48/02 |
| 2018/0352560 | A1* | 12/2018 | Feng | H04W 72/1284 |
| 2019/0104536 | A1* | 4/2019 | Wang | H04W 72/1268 |

\* cited by examiner

CO-EXISTENCE OF RELIABLE LOW LATENCY AND OTHER SERVICES IN A WIRELESS NETWORK

CLAIM OF PRIORITY UNDER 35 U.S.C. § 119

The present application for patent claims benefit of U.S. Provisional Patent Application Ser. No. 62/371,063, filed Aug. 4, 2016, assigned to the assignee hereof and hereby expressly incorporated by reference herein.

BACKGROUND

Field

Aspects of the present disclosure related generally to wireless communications systems, and more particularly, to co-existence of reliable low-latency services with other services in a wireless network.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists potential for further improvements in NR technology. Preferably, these improvements may be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for co-existence of reliable low-latency services with other services in a wireless network are described herein.

In an aspect, a method for wireless communications is provided. The method may be performed, for example, by a base station. The method generally includes reserving a first region of a set of resources to a first user for at least a first uplink transmission related to a first type of service, receiving the first transmission in the reserved first region, and dynamically assigning resources in a second region of the set of resources for at least a second uplink transmission related to the first type of service.

In an aspect, a method for wireless communications is provided. The method may be performed, for example, by a wireless node. The method generally includes transmitting a first uplink transmission in a reserved first region of a set of resources for at least a first uplink transmission related to a first type of service, receiving an assignment of resources for a second region of the set of resources for at least a second uplink transmission related to the first type of service, and transmitting the second uplink transmission based on the assignment.

In an aspect, a method for wireless communications is provided. The method may be performed, for example, by a wireless node. The method generally includes receiving an assignment of a set of resources for uplink transmissions, receiving an indication to terminate or suspend uplink transmissions for a reserved first region of the set of resources for at least a first uplink transmission related to a first type of service and terminating or suspending uplink transmission based on the indication to terminate or suspend uplink transmissions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
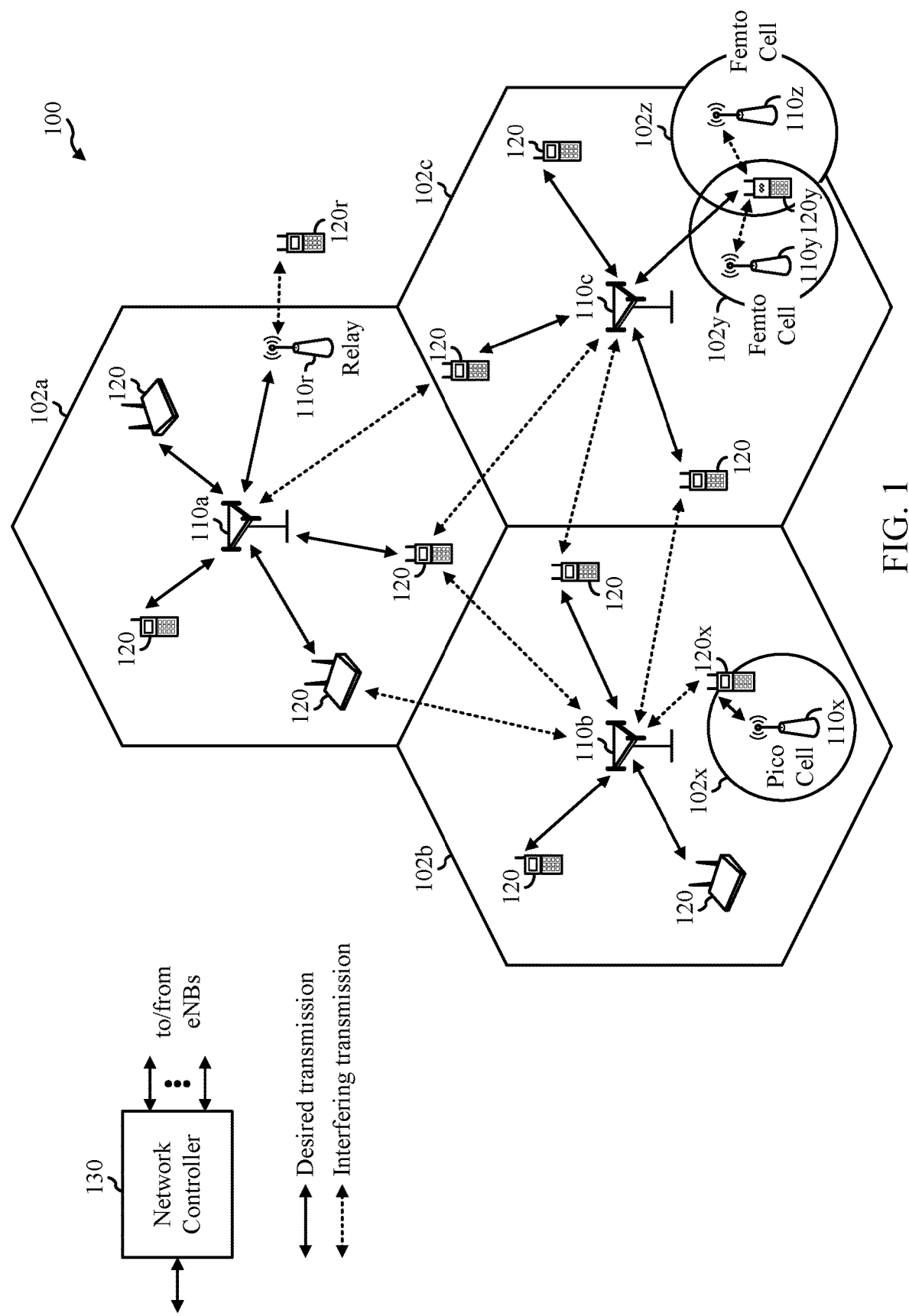
FIG. 1 is a block diagram conceptually illustrating an example telecommunications system, according to aspects of the present disclosure.

Aspects of the present disclosure provide apparatus, methods, processing systems, and computer program products for new radio (NR) (new radio access technology) cell measurement. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be new radio or 5G network. UEs 120, which may also be called user terminals 120, may be configured to perform the operations 1200 discussed in more detail below for determining a cell type of a cell and communicating with the cell based on the determination. Node B 110 may include a transmission reception point (TRP) configured to perform the operations 1300 discussed in more detail below for identifying the cell type and providing an indication of the cell type to the UE 120. The NR network may include a central unit 140. The new radio network 100 may include the central unit 140 configured to perform the operations 1400 discussed in more detail below for determining cell types for TRPs and configuring the TRPs with the cell types. According to certain aspects, the UEs 120, Node B 110 (TRP), and central unit 140 may be configured to perform operations related to measurement configuration, measurement reference signal transmission, monitoring, detection, measurement, and measurement reporting, which are described in greater detail below.

The system illustrated in FIG. 1 may be, for example, a long term evolution (LTE) network. The wireless network 100 may include a number of Node Bs (e.g., evolved NodeBs (eNB), 5G Node B, etc.) 110 and other network entities. A Node B may be a station that communicates with the UEs and may also be referred to as a base station, an access point, etc. A Node B and 5G Node B are other examples of stations that communicate with the UEs.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each sub-frame may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
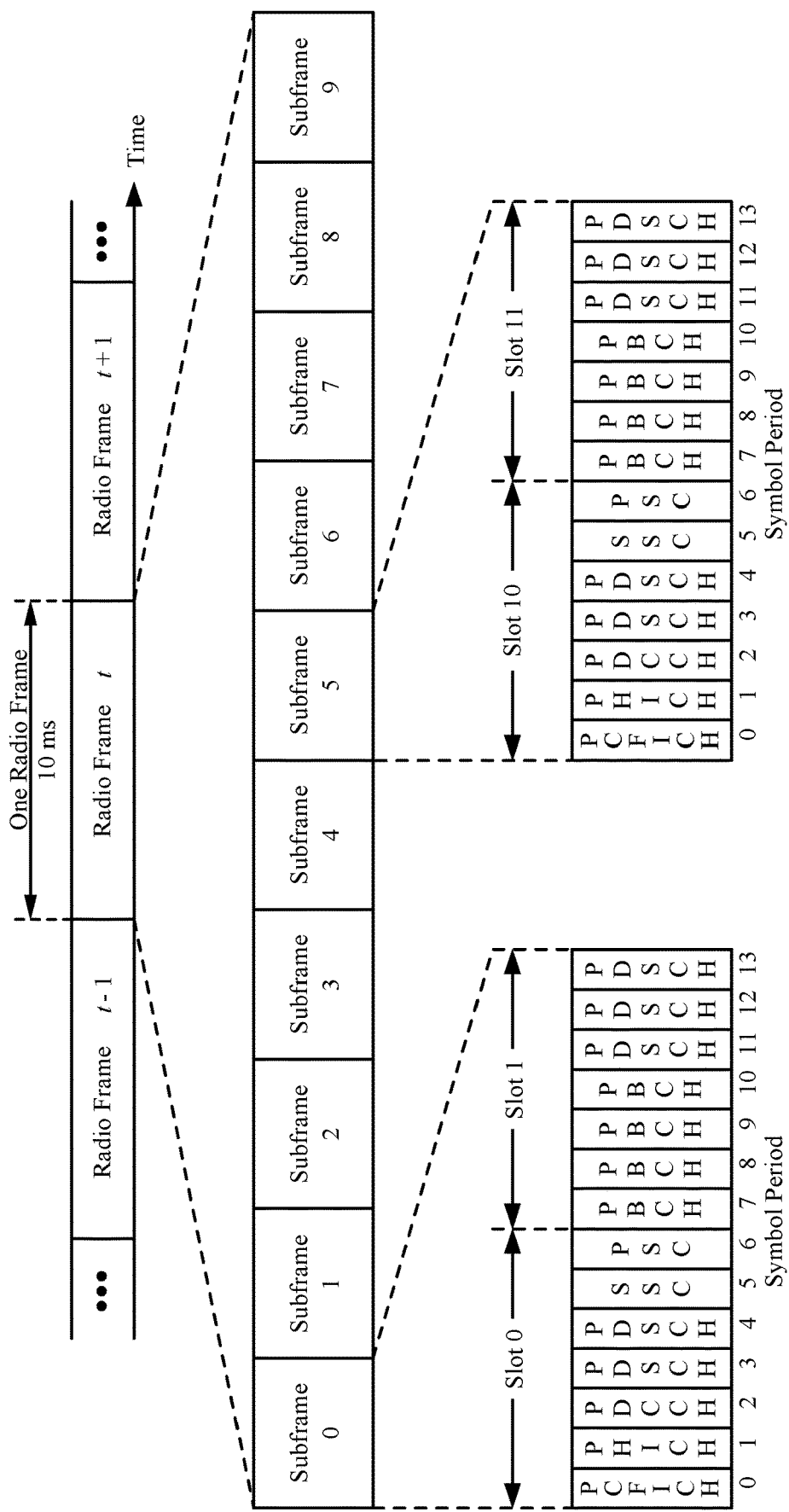
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
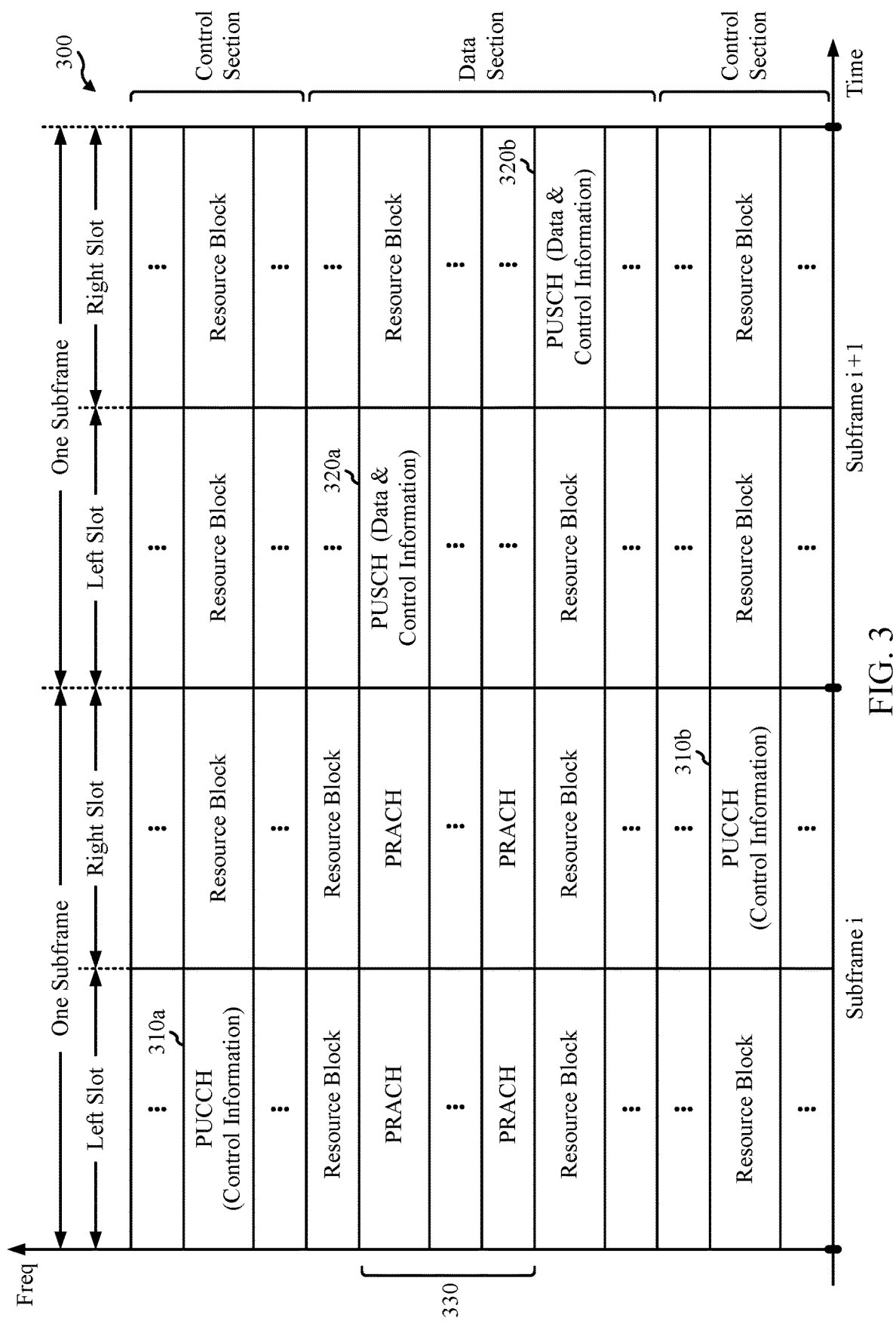
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
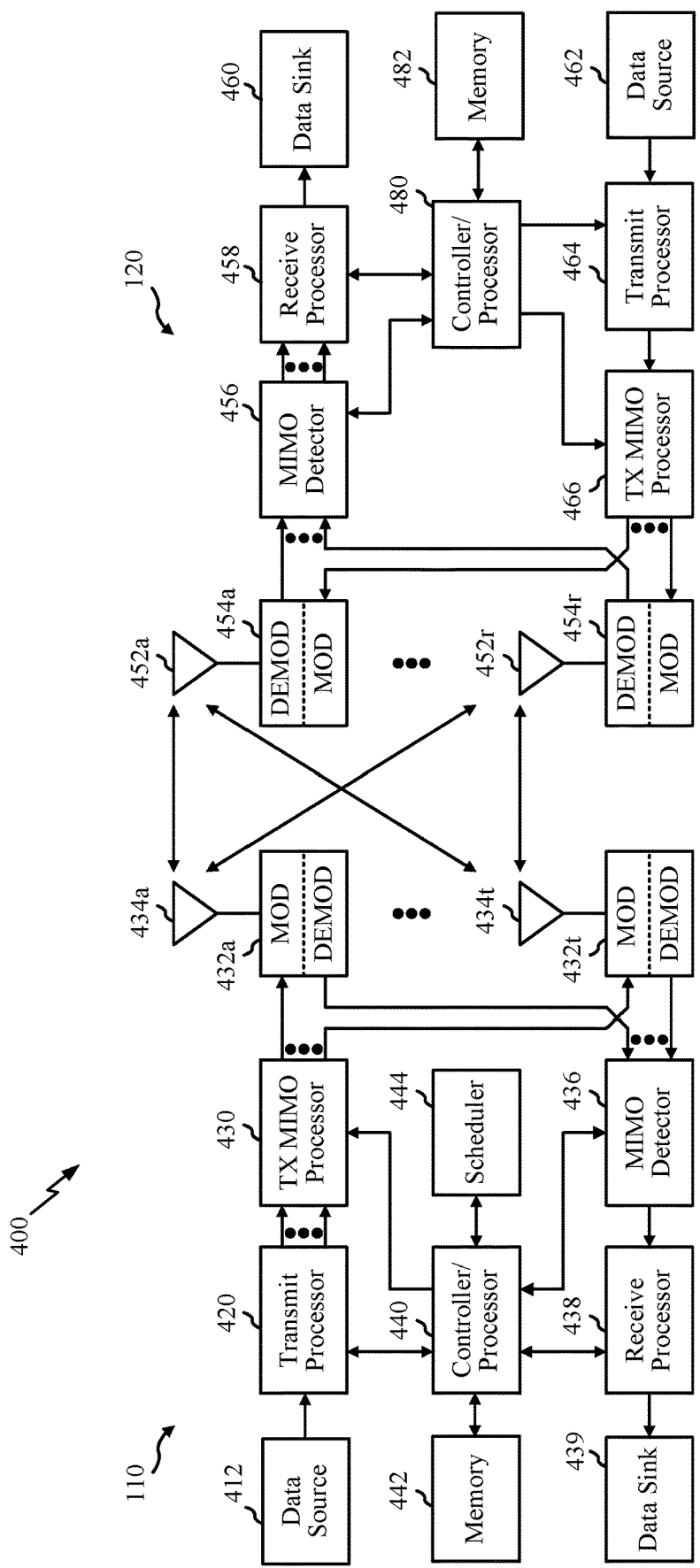
FIG. 4 is a block diagram conceptually illustrating a design of an example Node B and user equipment (UE), according to aspects of the present disclosure.

FIG. 4 illustrates example components of the base station/Node B 110 and UE 120 illustrated in FIG. 1, which may be used to implement aspects of the present disclosure. One or more components of the AP 110 and UE 120 may be used to practice aspects of the present disclosure. For example, antennas 452, Tx/Rx, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 12-14.

FIG. 4 shows a block diagram 400 of a design of a base station/Node B 110 and a UE 120, which may be one of the base stations/Node Bs 110 and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-14, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
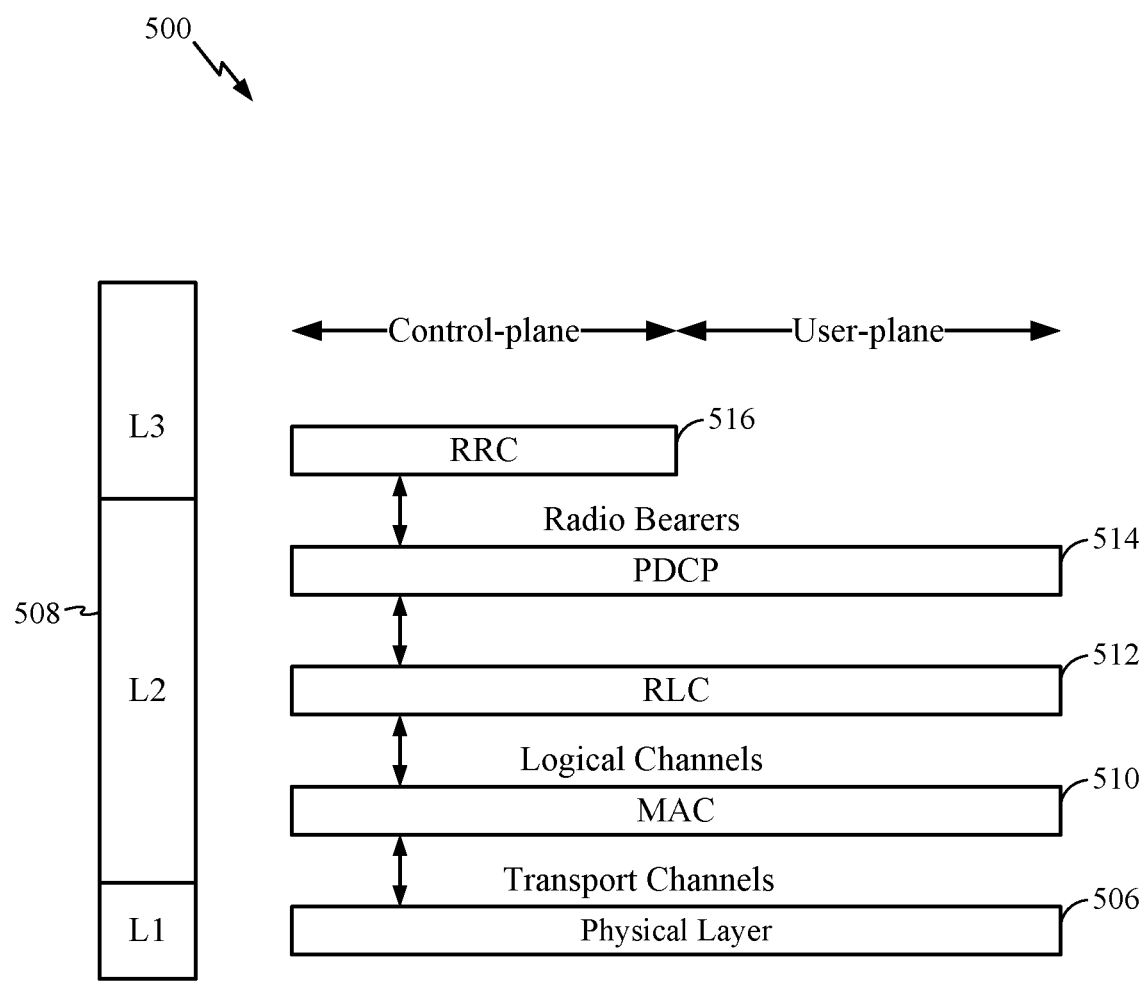
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
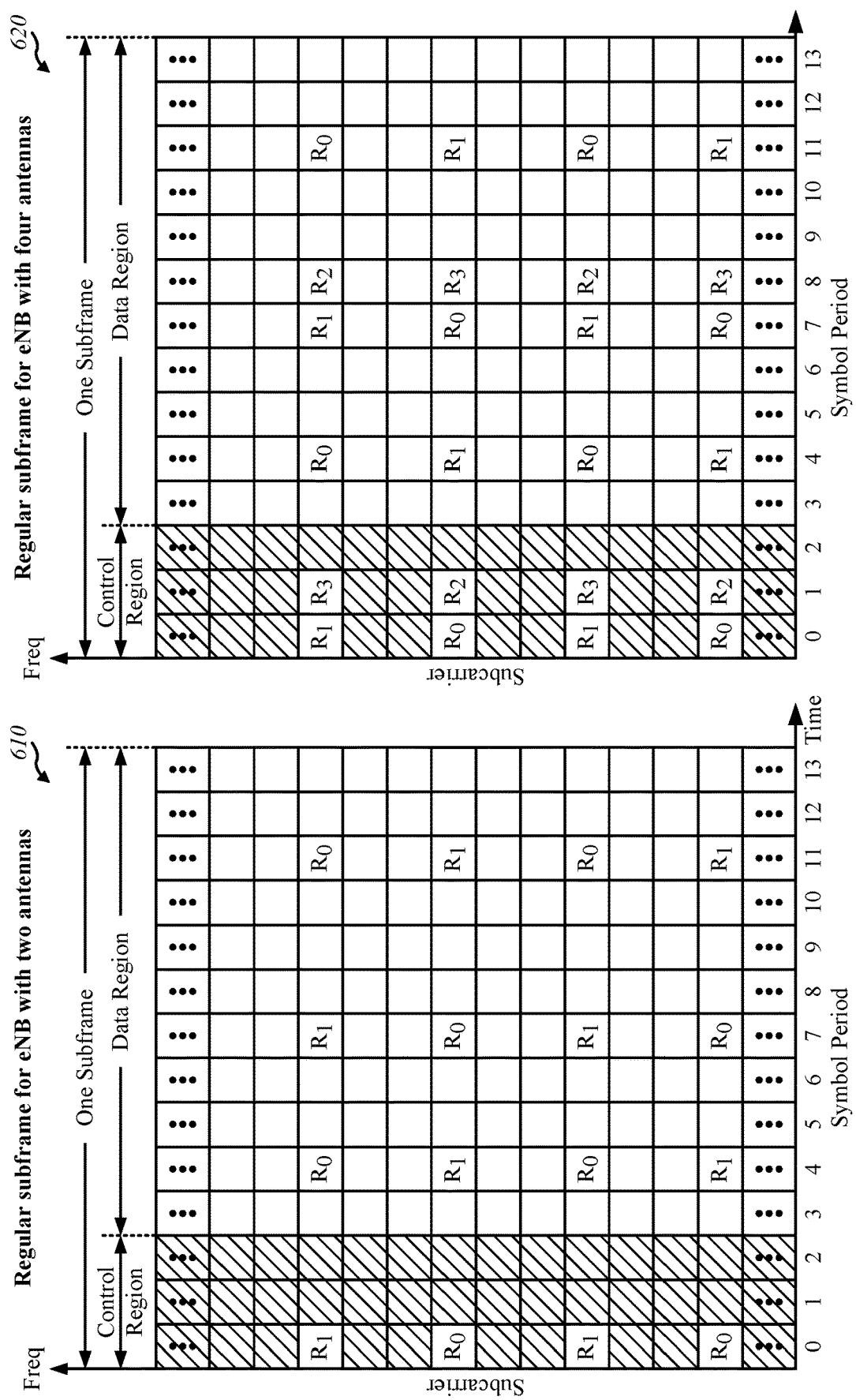
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

Example New Radio Cell Measurement

New radio (NR) may refer to radios configured to operate according a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., central unit). The CU may be an Access node controller (ANC). The CU terminates backhaul interface to RAN-CN, terminates backhaul interface to neighbor RAN node. The RAN may include a Distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Example Latency and Reliability Parameters for a Wireless Network

Wireless standards, such as 5G, may include latency and reliability parameters. Latency in a network may refer to the amount of time required for a packet of data to get from one point in the network to another point in the network. For example, latency in the user plane may be defined based on the time required for successful delivery of an application layer packet from a layer 2 or 3 medium access control (MAC) service data units (SDUs) ingress point to a layer 2 or 3 MAC SDU egress point through a radio interface. Average latency for URLLC may target 0.5 ms for UL and 0.5 ms for DL in the user plane for certain standards. Average latency for eMBB may target 4 ms for UL and DL and for mMTC, latency may be no worse than 10 seconds on UL for a 20 byte application layer packet (105 bytes at the PHY layer with uncompressed IP headers) at 164 dB minimum coupling loss (MCL).

A wireless standard may include a reliability requirement separate from the latency requirement. Reliability in a network may refer to a probability of successfully transmitting X number of bytes within 1 ms, where 1 ms is the time to deliver a small packet from a protocol layer 2 or 3 SDU ingress point to an egress point, at a certain channel quality. For example, reliability for URLLC may be $1 \times 10^{-5}$ within 1 ms for X number of bytes (e.g., 20 bytes), with a user plane latency of 1 ms. As another example enhanced vehicle-to-X (eV2X) may require reliability of $1 \times 10^{-5}$ for 300 bytes within 1 ms. Additionally user plane latency of 3-10 ms for direct communications via a sidelink and communication range of, for example, a few meters, along with user plane latency of 2 ms when a packet is relayed via a BS may be provided.

To achieve $1 \times 10^{-5}$ reliability within 1 ms along with the target 0.5 ms latency for URLLC services, interference from other URLLC users as well as other services, such as eMBB users, may be minimized. For DL, given the target latency requirement, a URLLC transmission may puncture another lower priority transmission. For example, as DL may be controlled by a Node B, the Node B may schedule the URLLC transmission to transmit at a location where a lower priority transmission was originally scheduled. Accordingly, the lower priority transmission may be punctured (i.e., the URLLC transmission is transmitted by the Node B instead of the lower priority transmission) at the location where the newly scheduled URLLC transmission has been scheduled that overlaps with the lower priority transmission. One such lower priority transmission may be a transmission by an eMBB user. The Node B may rely on upper protocol layers (e.g., retransmissions that are automatically requested by upper layers of the communications protocol stack) or other mechanisms as disclosed herein to minimize the impact of such scheduling and puncturing to the eMBB users. For UL, all UL assignments are scheduled well in advance and cannot be dynamically punctured spontaneously. For example, a lower priority transmission, such as eMBB, may be transmitting from a first UE. If a second UE attempts to transmit a URLLC transmission during the time the first UE is transmitting, the two transmissions may collide and result in interference. Accordingly, techniques allowing for coexistence of reliable low-latency services with other services in a wireless network may be provided.

Co-Existence of Reliable Low-Latency Services with Other Services in a Wireless Network Avoiding or minimizing the impact of interference between UL transmissions of reliable low latency services, such as URLLC, may be implemented to help meet the reliability and latency requirements when such services are operating together on a wireless network as UL transmission between multiple wireless devices may not be easily punctured. Puncturing may include, for example, selecting one or more time periods during which select users may be restricted from accessing the defined 'punctured' portion of one or more communication channels. This puncturing time period may act as a restriction to communication channel access in addition to any other restrictions implicated by use of a particular multiple access protocol. By preventing one or more users from accessing the communication channel during the puncturing time period, a lowering of interference on the communications channel may result in those situations where re-use of the channel is implemented but may also affect bandwidth and throughput and in some cases may be difficult to implement depending on communication scheme requirements. Low-latency services may be transmitted and received quickly as delays increase the latency of the services. As UL slots are typically assigned multiple milliseconds in advance, it may be difficult to schedule or reschedule UL assignments fast enough to adequately meet latency requirements (e.g., 0.5 ms). For example, when a regular eMBB service is multiplexed with URLLC this difficulty in scheduling both fast enough may occur. Therefore, because of the difficulty is scheduling, it may be desirable to reschedule the eMBB service whenever there is a URLLC transmission. Thus, in the downlink direction, minimizing the impact of interference may be achieved by puncturing DL eMBB data with URLLC, but on the uplink, the eMBB data may be scheduled ahead of time as noted above, so such dynamic puncturing may be challenging.

Figure 7:
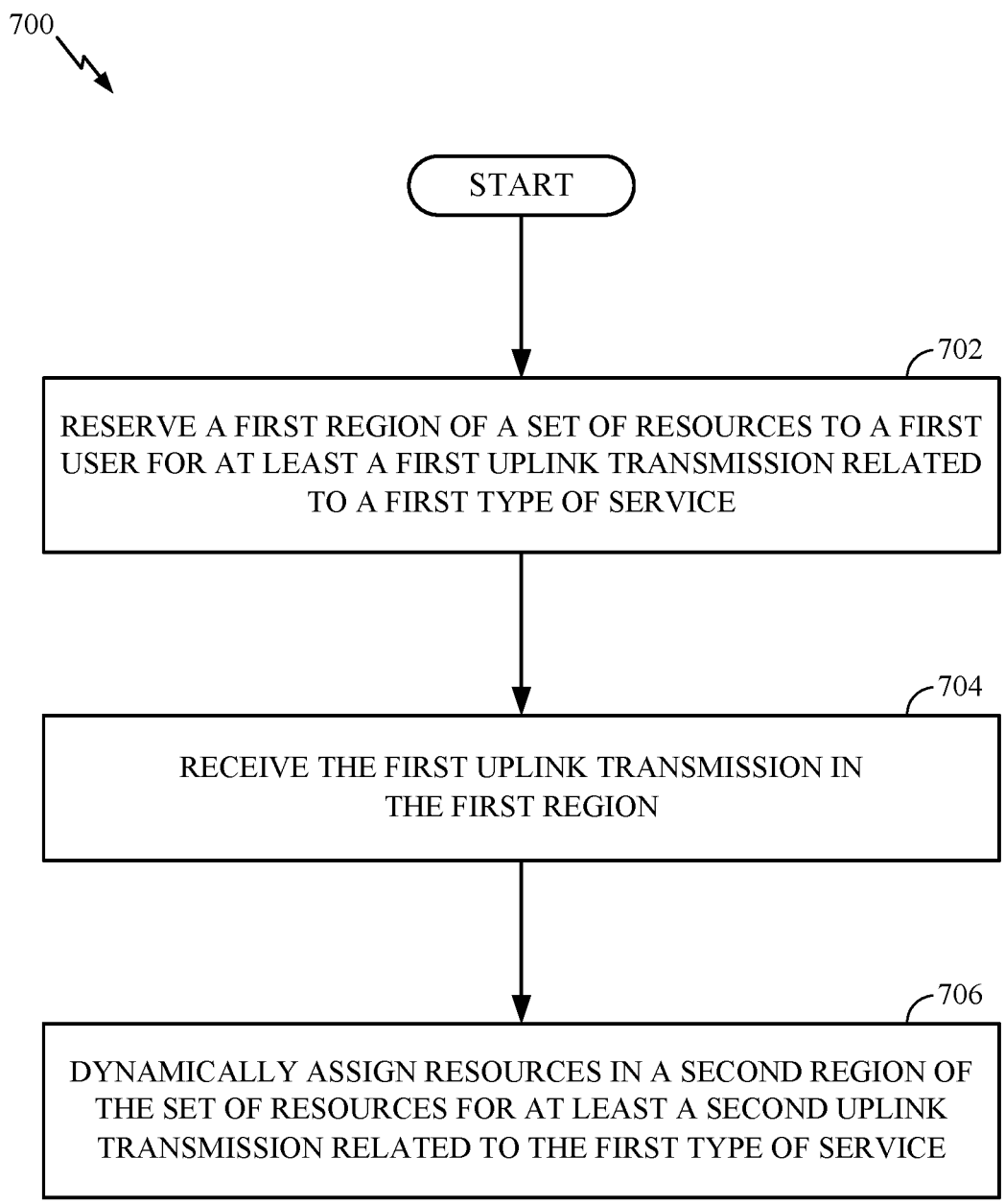
FIG. 7 is a flowchart illustrating example operations for wireless communications by a base station, according to aspects of the present disclosure.

FIG. 7 is flowchart illustrating example operations 700 for wireless communications by a base station, according to aspects of the present disclosure. The operations 700 may be performed, for example, by a base station (e.g., base station/Node B 110). Operations 700 may begin at 702 by reserving a first region of a set of resources to a first user for at least a first uplink transmission related to first type of service. At 704, receiving the first uplink transmission in the reserved first region. At 706, dynamically assigning resources in a second region of the set of resources for at least a second uplink transmission related to the first type of service. In one or more cases, the operations may further include transmitting, to a second user, an indication to terminate or suspend uplink transmissions related to a second type of service using resources in the first region.

Figure 8A:
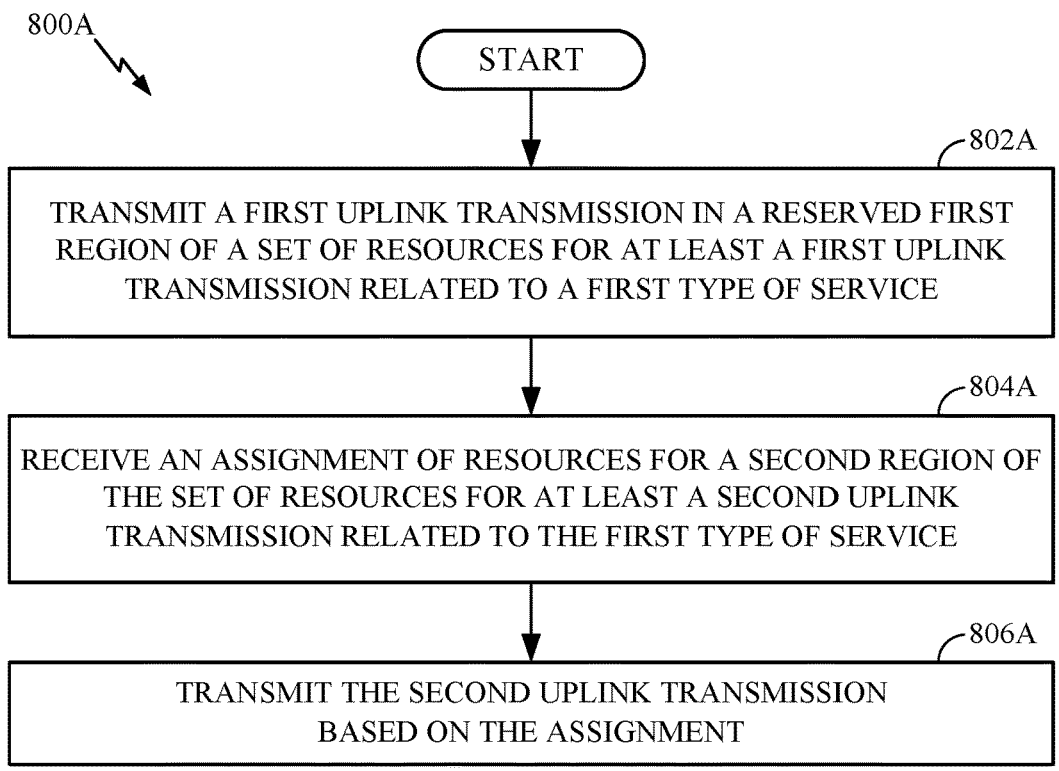
FIGS. 8A and 8B are flowcharts illustrating example operations for wireless communications by wireless nodes, according to aspects of the present disclosure.
Figure 8B:
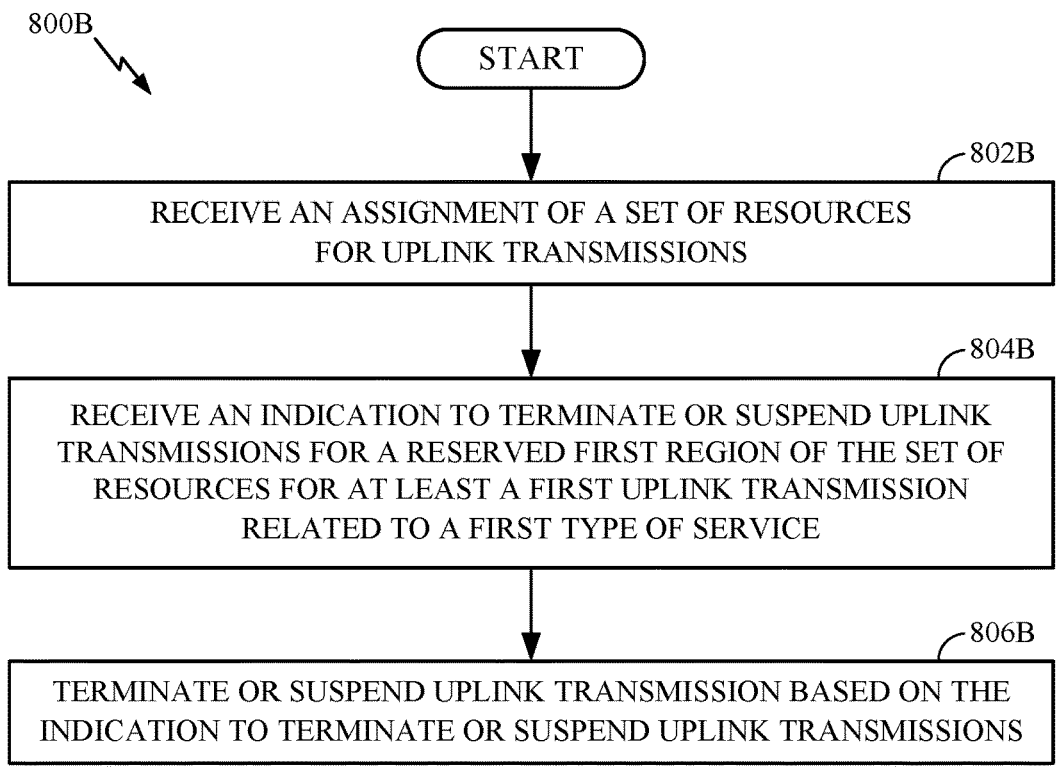

FIGS. 8A and 8B are flowcharts illustrating example operations 800A and 800B for wireless communications by wireless nodes, according to aspects of the present disclosure. The operations 800A may be performed by, for example, a wireless node (e.g., UE 120). Operations 800A may begin at 802 by transmitting a first uplink transmission in a reserved first region of a set of resources for at least a first uplink transmission related to a first type of service. At 804, receiving an assignment of resources for a second region of the set of resources for at least a second uplink transmission related to the first type of service. At 806, transmitting the second uplink transmission based on the assignment. In other cases, additional operations may be included such as, for example, receiving an indication to monitor for the indication to terminate or suspend uplink transmissions in a downlink transmission. In one or more cases, the indication to terminate or suspend uplink transmissions may be received when there is an overlap between the reserved first region and resources used by the wireless node.

The operations 800B may be performed by, for example, a wireless node (e.g., UE 120). Operations 800B may begin at 802 by receiving an assignment of a set of resources for uplink transmissions. At 804, receiving an indication to terminate or suspend uplink transmissions for a reserved first region of the set of resources for at least a first uplink transmission related to a first type of service. At 806, terminating or suspending uplink transmission based on the indication to terminate or suspend uplink transmissions.

According to aspects of the present disclosure, dedicated resources may be reserved for low-latency services. For example, of a set of resources, otherwise allocated to another UE or service, a portion of that set of resources may be reserved and dedicated for use by low-latency services. However, reserving sufficient resources to completely transmit low-latency services may reduce bandwidth efficiency.

Accordingly, resource reservation may be combined with adaptive reassignment to efficiently use available bandwidth and still provide a reserved set of resources for low-latency services. As an example of resource reservation and adaptive reassignment, sufficient dedicated resources may be reserved for a low-latency service request, such as a URLLC service request transmission. For example, one or more bits of an UL assignment, may be reserved for the URLLC service request. The UE having the UL assignment does not transmit during this reserved period, and another UE may transmit a URLLC service request during this reserved period. After receiving the low-latency service request, a Node B may dynamically schedule the remainder of the low-latency UL transmission to other non-reserved regions to keep the reserved resource available. Dynamic scheduling may include rescheduling other services, such as eMBB. This reserved resource may be defined, for example in a standard, or dynamically configured.

According to aspects of the present disclosure, in another example of resource reservation and adaptive reassignment, sufficient dedicated resources may be reserved for a first transmission of a low-latency service uplink. Services, such as eMBB, may be scheduled with 0.5 ms of scheduling granularity, such that the Node B may potentially schedule a separate user or transmission each 0.5 ms and it may take up to 0.5 ms to reschedule a previous UL assignment. If a low-latency transmission occurs prior to the 0.5 ms scheduling timeframe, there will be an unavoidable collision absent some reserved resource. A resource, such as one RB of an UL assignment, may be reserved for low-latency services, avoiding interference from other services and low-latency services. Reserving resources sufficient for an initial transmission of the low-latency service allows the low-latency service to very quickly transmit some information without having to wait for a round-trip to the Node B and back. The low-latency service may utilize this resource reservation without waiting for an UL resource assignment. The Node B, after receiving the initial low-latency service transmission, may dynamically schedule the remainder of the low-latency UL transmission to other non-reserved regions and clear other users or services to accommodate subsequent transmission or retransmission of the low-latency service. This helps minimize the size of the reserved resource and helps keep the reserved resource available. The reserved resource may also include resources sufficient for an immediate re-transmission of the initial transmission.

According to aspects of the present disclosure, services other than low-latency services may avoid low-latency services to avoid interference. For example, a UE utilizing services other than low-latency services may receive regular assignment updates to terminate or reschedule an UL assignment, allowing for fast service turn-around and reliable grants for low-latency or other higher priority services. For example, a first UE may be scheduled for a particular transmission. Prior to transmission, the first UE may perform a check for an enabling bit, signaled by the Node B for each symbol transmission, for example on a DL control channel. If the enabling bit was received, the first UE may proceed with the symbol transmission. If the enabling bit is not received, then the first UE does not proceed with the symbol transmission under the assumption that the symbol period may be required by a second UE with a higher priority transmission. Not transmitting if the enabling bit is not received provides protection against reception issues where the enabling bit is not received and the second UE proceeds to transmit over a low-latency transmission.

Checking for an enabling bit for each symbol period may introduce significant additional DL control overhead and rapid control monitoring, along with additional UE power consumption. To reduce the amount of control overhead and rapid monitoring, enabling bit handling may be performed only for regions overlapping with reserved resources. For example, a set of resources may be allocated to a Node B for an eMBB UL transmission where a region of the set of resources is reserved for low-latency service (e.g., a service request or resources sufficient for an initial transmission). The Node B may utilize the resource allocation for the eMBB UL transmission. The Node B may, prior to utilizing the reserved resources, check to see whether the Node B received an enabling bit for the reserved resource. If the Node B receives the enabling bit, then the Node B may utilize the reserved resource for eMBB UL. If the Node B does not receive the enabling bit, then the Node B does not utilize the reserved resource. The Node B may also transmit an indication to UEs to perform monitoring for the enabling bit.

According to aspects of the present disclosure, a UE may indicate, to the Node B, the capabilities of the UE (e.g., capability information) with respect to interference avoidance for low-latency services. This indication may be sent, for example, during initial access of the Node B by the UE. The UE may indicate to the Node B what features the UE may support for interference avoidance for low-latency services. For example, the UE may indicate that the UE is capable of monitoring DL signaling for the enabling bit and rapidly yielding when the enabling bit is not present. The UE may also indicate to the Node B that the UE can handle UL bursty interference. When the Node B schedules UEs in regions where there are potential collisions with low-latency services, the Node B may select only UEs with high SNR or select UEs with a more conservative modulation and coding scheme (MCS) to handle potential collisions.

Signaling the UE capabilities with respect to interference avoidance for low-latency services enables gradual deployments, for example where UEs from an earlier release may not support rapid yielding, while later releases may add in such support. Similarly, a UE may also indicate to the Node B, the capabilities of the UE with respect to DL puncturing.

In another aspect of disclosed examples, low latency services and other services may be orthogonalized or separated as much as possible. In one such example, spatial division multiple access (SDMA) or spatial beam separation may be utilized to reduce interference between UEs utilizing low-latency services and other UEs. In such cases, UEs utilizing low latency services may transmit regular sounding reference signals (SRS) to perform beam training and select a beam for communicating with the UE based on the beam training. According to certain aspects the beam selected for low-latency services may be a narrow-beam. The Node B may, based on the SRS, schedule SDMA with the UE and other UEs.

According to aspects of the present disclosure, a Node B may also utilize interference cancellation to separate colliding uplink transmissions. Generally, low-latency services have relatively small packets and low data rates, while other services, such as eMBB, have high data rates and larger packets. A Node B may be able to take advantage of these properties by allowing UL collisions between low-latency services and other services and use Node B side interference cancellation to remove one of the UL transmissions and decode the other transmission. In one or more cases a colliding uplink transmission has a higher data rate than a first or second uplink transmission.

According to aspects of the present disclosure, low-latency services may be designed based on partial collisions with other services. As other services may be scheduled with a=0.5 ms of granularity, where the first 0.5 ms collides, the second 0.5 ms may be clear. The low-latency service may be designed such that the low-latency service primarily relies on the second 0.5 ms UL window to meet reliability and latency requirements, where the first 0.5 ms is understood to be a best effort transmission and a much higher success rate in the second 0.5 ms UL window. In relying on the second 0.5 ms UL window, the low-latency service may adjust the UL transmission power, allocation, or otherwise transmit more aggressively during the second 0.5 ms UL window.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120, which is also called a UE 120, (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above may also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it may be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a base station, comprising:
   reserving a first region of a set of resources for at least a first uplink transmission related to a first type of service having a first latency requirement;
   assigning a second region of the set of resources to a first user for a second uplink transmission related to a second type of service having a second latency requirement;
   receiving, from a second user, the first uplink transmission in the first region; and
   in response to the first uplink transmission:
      transmitting, to the first user, an indication to terminate or suspend the second uplink transmission; and
      dynamically assigning the second region of the set of resources to the second user for a third uplink transmission related to the first type of service.

2. The method of claim 1, wherein the first uplink transmission comprises a service request.

3. The method of claim 1, wherein the first uplink transmission comprises an initial transmission and the third uplink transmission comprises a subsequent transmission or a retransmission of the initial transmission.

4. The method of claim 1, wherein the indication comprises a bit enabling the second user to utilize the second region.

5. The method of claim 1, further comprising:
   transmitting, to the first user, an indication to monitor for the indication to terminate or suspend uplink transmissions in a downlink transmission.

6. The method of claim 1, further comprising:
   receiving capability information from at least the first user or the second user; and wherein the indication to terminate or suspend uplink transmissions is transmitted based on the capability information.

7. The method of claim 6, wherein the capability information indicates at least one of:
a capability to monitor for the indication; or
a capability to handle uplink bursty interference.

8. The method of claim 1, wherein the base station communicates with the first user and the second user using spatially separated beams.

9. The method of claim 1, further comprising:
performing interference cancellation between at least one of the first and second uplink transmissions and a colliding uplink transmission from at least the second user.

10. The method of claim 9, wherein:
the colliding uplink transmission has a higher data rate than the first or second uplink transmission.

11. The method of claim 1, wherein the first type of service is a low latency service, and wherein the first latency requirement requires a lower latency relative to a latency required by the second latency requirement.

12. A method of wireless communication by a wireless node, comprising:
transmitting, to a base station, a first uplink transmission in a reserved first region of a set of resources for at least a first uplink transmission related to a first type of service having a first latency requirement, the first uplink transmission configured to trigger the base station to terminate or suspend a second uplink transmission by a second user in a second region of the set of resources, the second uplink transmission related to a second type of service having a second latency requirement;
receiving an assignment of resources for the second region of the set of resources for at least a third uplink transmission related to the first type of service; and
transmitting the third uplink transmission based on the assignment.

13. The method of claim 12, wherein the first uplink transmission comprises a service request.

14. The method of claim 12, wherein the first uplink transmission comprises an initial transmission and the third uplink transmission comprises a subsequent transmission or a retransmission of the initial transmission.

15. A method of wireless communication by a wireless node, comprising:
receiving, by the wireless node, an assignment of a first region of a set of resources for uplink transmissions related to a first type of service having a first latency requirement, the set of resources comprising a second region reserved for uplink transmissions related to a second type of service having a second latency requirement;
receiving, by the wireless node, an indication to terminate or suspend uplink transmissions for the first region of the set of resources for at least a second uplink transmission related to the second type of service; and
terminating or suspending uplink transmissions related to the first type of service based on the indication to terminate or suspend uplink transmissions.

16. The method of claim 15, wherein the indication comprises a bit indicating whether enabling the wireless node is permitted to utilize the first region.

17. The method of claim 15, wherein the indication to terminate or suspend uplink transmissions is received when there is an overlap of resources in the first region of the set of resources between the uplink transmissions related to a first type of service and the uplink transmissions relates to the second type of service.

18. The method of claim 15, further comprising:
receiving an indication to monitor for the indication to terminate or suspend uplink transmissions in a downlink transmission.

19. The method of claim 15, further comprising:
transmitting capability information of the wireless node, wherein the indication to terminate or suspend uplink transmissions is transmitted based on the capability information.

20. The method of claim 19, wherein the capability information indicates at least one of:
a capability to monitor for the indication; or
a capability to handle uplink bursty interference.

21. A wireless node, comprising:
a memory; and
a processor communicatively coupled to the memory, the processor configured to:
receive an assignment of a first region of a set of resources for uplink transmissions related to a first type of service having a first latency requirement, the set of resources comprising a second region reserved for uplink transmissions related to a second type of service having a second latency requirement;
receive an indication to terminate or suspend uplink transmissions for the first region of the set of resources for at least a second uplink transmission related to the second type of service; and
terminate or suspend uplink transmissions related to the first type of service based on the indication to terminate or suspend uplink transmissions.

22. The wireless node of claim 21, wherein the indication comprises a bit indicating whether the wireless node is permitted to utilize the first region.

23. The wireless node of claim 21, wherein the indication to terminate or suspend uplink transmissions is received when there is an overlap of resources in the first region of the set of resources between the uplink transmissions related to a first type of service and the uplink transmissions relates to the second type of service.

24. The wireless node of claim 21, wherein the processor is further configured to:
receive an indication to monitor for the indication to terminate or suspend uplink transmissions in a downlink transmission.

25. The wireless node of claim 21, wherein the processor is further configured to:
transmit capability information of the wireless node, wherein the indication to terminate or suspend uplink transmissions is transmitted based on the capability information.

26. The wireless node of claim 25, wherein the capability information indicates at least one of:
a capability to monitor for the indication; or
a capability to handle uplink bursty interference.

* * * * *